United States Patent [19]
Brown et al.

[11] Patent Number: 5,488,573
[45] Date of Patent: Jan. 30, 1996

[54] METHOD FOR GENERATING TEST PROGRAMS

[75] Inventors: Gary Brown; Jiro Miyake, both of Osaka, Japan

[73] Assignee: Matsushita Electric Industrial Co., Ltd., Osaka, Japan

[21] Appl. No.: 115,102

[22] Filed: Sep. 2, 1993

[51] Int. Cl.$^6$ ................................................. G06F 17/00
[52] U.S. Cl. ................................................. 364/578; 371/27
[58] Field of Search ........................... 371/27, 16.1, 17; 364/579, 580, 578; 307/452, 272.1, 272.2

[56] References Cited

U.S. PATENT DOCUMENTS

| | | | |
|---|---|---|---|
| 4,716,364 | 12/1987 | Hung et al. | 371/27 |
| 5,041,742 | 8/1991 | Carhonaro | 307/452 |
| 5,281,864 | 1/1994 | Hahn et al. | 307/272.2 |
| 5,301,301 | 4/1994 | Kodosky et al. | 364/578 |

OTHER PUBLICATIONS

Schnurmann; "Program for Weighted Test Pattern Generation in Monte Carlo Testing of Integrated Testing"; IBM Technical Disclosure Bulletin vol. 16, No. 2, 1973.
Peters et al; "Automatic Generation of Bit Patterns for Array Testing"; IBM Tech. Dis. vol. 25, 7B, 1982.
Nagle et al; "Microprocessor Testability" IEEE Trans. on Ind. Electronics vol. 36, No. 2, 1989.
Thatte et al., "Test Generation for Microprocessors", IEEE Transactions on Computers, vol. C–29, No. 6, Jun. 1980, pp. 429–441.
Bellon et al., "Automatic Generation of Microprocessor Test Programs", 19th Design Automation Conference, 1982, Paper 33.2, pp. 566–573.
Middleton, "Functional Test Vector Generation for Digital LSI/VLSI Devices", 1983 International Test Conference, Paper 22.3, pp. 682–691.
Hunger et al., "Functional Characterization of Microprocessors", 1984 International Test Conference, Paper 24.1, pp. 794–803.
Brahme et al., "Functional Testing of Microprocessors", IEEE Transactions on Computers, vol. C–33, No. 6, Jun. 1984, pp. 475–485.
Su et al., "Functional Testing Techniques for Digital LSI/VLSI Systems", ACM IEEE 21st Design Automation Conference, 1984, pp. 517–528.
Lin et al., "Automatic Functional Test Program Generation for Microprocessors", 25th ACM/IEEE Design Automation Conference, 1988, Paper 38.7, pp. 605–608.
Klug, "Microprocessor Testing by Instruction Sequences Derived from Random Patterns", 1988 Internatonal Test Conference, Paper 4.2, pp. 73–80.
Talkhan et al., "Microprocessors Functional Testing Techniques", IEEE Transactions on Computer–Aided Design, vol. 8, No. 3, Mar. 1989, pp. 316–318.
Wagner et al., "Pseudorandom Testing", IEEE Transactions on Computers, vol. C–36, No. 3, Mar. 1987, pp. 332–343.

*Primary Examiner*—Ellis B. Ramirez
*Attorney, Agent, or Firm*—Willan Brinks Hofer Gilson & Lione

[57] ABSTRACT

The purpose of this invention is to automatically generate high quality test programs for the functional testing stage of microprocessor design. Programs for the functional testing are generated by a computer program using a random instruction generator. The generator produces instructions using four levels of abstraction: instructions, instruction categories, sequences, and functions. By choosing the level from which to pick instructions, test programs containing complicated sequences can be created, while at the same time random numbers may be used to produce instructions.

12 Claims, 18 Drawing Sheets

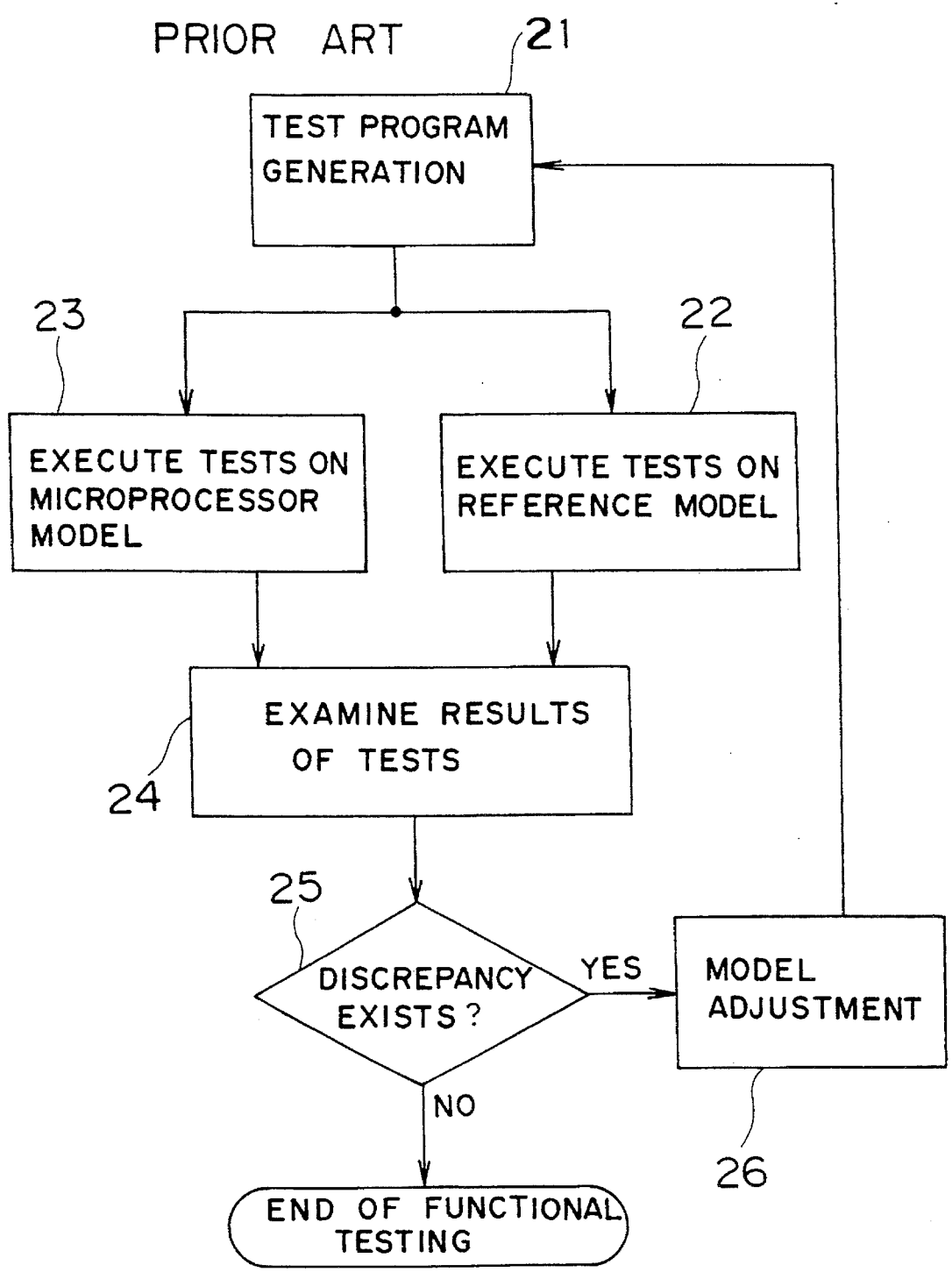

FIG. 3A

INSTRUCTION TABLE

| INSTRUCTION CATEGORY | INSTRUCTION |
|---|---|
| category 1 | inst.1.1 |
|  | inst.1.2 |
| category 2 | inst.2.1 |
|  | inst.2.2 |
|  | inst.2.3 |
|  | inst.2.4 |
| category 3 | inst.3.1 |
|  | inst.3.2 |

FIG. 3B

SEQUENCE TABLE

| FUNCTION | SEQUENCE |
|---|---|
| function 1 | seq.1.1 |
|  | seq.1.2 |
|  | seq.1.3 |
|  | seq.1.4 |
|  | seq.1.5 |
| function 2 | seq.2.1 |
|  | seq.2.2 |
| function 3 | seq.3.1 |
|  | seq.3.2 |
|  | seq.3.3 |
|  | seq.3.4 |

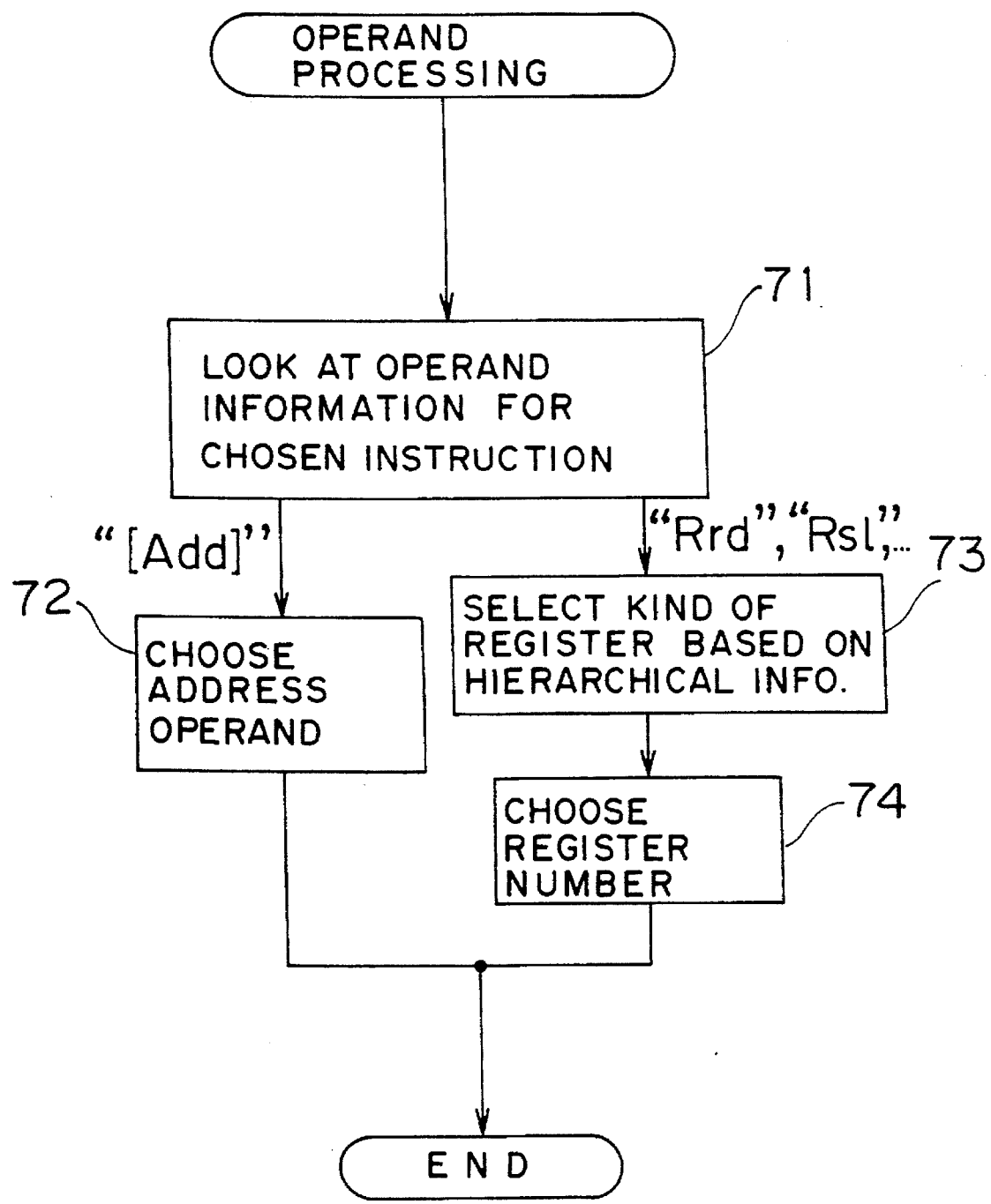

FIG. 7A

TYPES OF REGISTERS USED

| REGISTER NUMBER | i | o | l | g | fp |
|---|---|---|---|---|---|
| | 0 | 0 | 0 | 0 | 0 |
| | 1 | 1 | 1 | 1 | 1 |
| | 2 | 2 | 2 | 2 | 2 |
| | . | . | . | . | . |
| | . | . | . | . | . |
| | 7 | 7 | 7 | 7 | . |
| | | | | | 31 |

FIG. 7B

CHOICE OF REGISTERS

| 3 | 0 | 1 | 1 | 2 |
|---|---|---|---|---|

TYPES OF REGISTERS USED

| REGISTER NUMBER | i | o | l | g | fp |
|---|---|---|---|---|---|
| | 3 | 7 | 4 | 5 | 24 |
| | 5 | 2 | 2 | 0 | 12 |
| | 2 | 5 | 6 | 3 | 15 |
| | 1 | 1 | 5 | 4 | 6 |
| | 4 | 0 | 3 | 2 | 28 |
| | . | . | . | . | . |
| | . | . | . | . | . |

FIG. 11A

```
>load    /       /       /       /[Add]Rrd|—
$ldsb    /—      /—      /b      /[Add]Rrd|—
$ldsh    /—      /—      /h      /[Add]Rrd|—
$ldub    /—      /—      /b      /[Add]Rrd|—
$lduh    /—      /—      /h      /[Add]Rrd|—
$ld      /—      /—      /w      /[Add]Rrd|—
$ldd     /—      /—      /d      /[Add]Rrd|—
$ld      /—      /—      /w      /[Add]Frd|—

>store   /       /       /       /Rrd[Add]|—
$stb     /—      /—      /b      /Rrd[Add]|—
$sth     /—      /—      /h      /Rrd[Add]|—
$st      /—      /—      /w      /Rrd[Add]|—
$std     /—      /—      /d      /Rrd[Add]|—
$st      /—      /—      /w      /Frd[Add]|—
$st      /—      /—      /w      /%fsr[Add]|—
$std     /p      /—      /d      /%fq [Add]|—
```

FIG. 11B

```
>logic
 $and       /-    /cc   /Rsl Roi Rrd
 $andn      /-    /cc   /Rsl Roi Rrd
 $or        /-    /cc   /Rsl Roi Rrd
 $orn       /-    /cc   /Rsl Roi Rrd
 $xor       /-    /cc   /Rsl Roi Rrd
 $xnor      /-    /cc   /Rsl Roi Rrd
>shift
 $sll       /-    /-    /Rsl Roi Rrd
 $srl       /-    /-    /Rsl Roi Rrd
 $sra       /-    /-    /Rsl Roi Rrd
>iarith
 $add       /-    /cc   /Rsl Roi Rrd
 $addx      /-    /cc   /Rsl Roi Rrd
 $taddcc    /-    /-    /tv  /Rsl Roi Rrd
 $sub       /-    /cc   /Rsl Roi Rrd
 $subx      /-    /cc   /Rsl Roi Rrd
 $tsubcc    /-    /-    /tv  /Rsl Roi Rrd
 $mulscc    /-    /-    /Rsl Roi Rrd
```

FIG. 12A

|   |   |   |   |   |   |   |   |   |   |   |   | load | |
|---|---|---|---|---|---|---|---|---|---|---|---|------|---|
| — | — | — | — | — | — | — | — | — | — | — | load | store | — |
| — | — | — | — | — | — | — | — | — | store | load | load | — |
| — | — | — | — | — | — | store | load | load | load | — |
| — | — | — | — | — | store | load | load | load | load | load | — |
| — | — | — | store | load | load | load | load | load | load | — |
| — | store | load | load | load | load | load | load | load | load | — |

> load – store
$ load    store
$ load    load    store
$ load    load    load    store
$ load    load    load    load
$ load    load    load    load
$ load    load    load    load
$ load    load    load    load
$ load    load    load    load
$ load    load    load    load
$ load    load    load    load
$ load    load    load    load
$ load    load    load    —
$ load    load    —
$ store   —

FIG. 12B

| >alu-branch | | | | |
|---|---|---|---|---|
| $iarith | bicc | — | — | — |
| $logic | bicc | — | — | — |
| $iarith | logic | bicc | — | — |
| $logic | iarith | bicc | — | — |
| $iarith | iarith | logic | bicc | — |
| $iarith | iarith | iarith | bicc | — |
| $iarith | logic | iarith | bicc | — |
| $iarith | logic | logic | bicc | — |
| $logic | iarith | iarith | bicc | — |
| $logic | iarith | iarith | bicc | — |
| $logic | logic | iarith | bicc | — |
| $logic | logic | logic | bicc | — |

FIG. 12C

|       | >alu | $iarith | $iarith | $iarith | $iarith | $iarith | $iarith | $iarith | $logic | $logic | $logic | $logic | $logic | $logic | $logic |
|-------|------|---------|---------|---------|---------|---------|---------|---------|--------|--------|--------|--------|--------|--------|--------|
| >alu    | – | –      | –      | –      | –      | –      | –      | –      | –     | –     | –     | –     | –     | –     | –     |
| $iarith | – | –      | iarith | iarith | iarith | iarith | iarith | iarith | –     | logic | logic | logic | logic | logic | logic |
| $iarith | – | iarith | iarith | iarith | iarith | iarith | iarith | –      | –     | logic | logic | logic | logic | logic | logic |
| $iarith | – | iarith | iarith | iarith | iarith | iarith | –      | –      | logic | logic | logic | logic | logic | logic | –     |
| $iarith | – | iarith | iarith | iarith | iarith | –      | –      | –      | logic | logic | logic | logic | logic | –     | –     |
| $iarith | – | iarith | iarith | iarith | –      | –      | –      | –      | logic | logic | logic | logic | –     | –     | –     |
| $iarith | – | iarith | iarith | –      | –      | –      | –      | –      | logic | logic | logic | –     | –     | –     | –     |
| $iarith | – | iarith | –      | –      | –      | –      | –      | iarith | logic | logic | –     | –     | –     | –     | –     |
| $logic  | – | –      | –      | –      | –      | –      | –      | –      | –     | –     | –     | –     | –     | –     | –     |
| $logic  | – | logic  | logic  | logic  | logic  | logic  | logic  | logic  | –     | –     | –     | –     | –     | –     | –     |
| $logic  | – | logic  | logic  | logic  | logic  | logic  | logic  | –      | –     | –     | –     | –     | –     | –     | –     |
| $logic  | – | logic  | logic  | logic  | logic  | logic  | –      | –      | –     | –     | –     | –     | –     | –     | –     |
| $logic  | – | logic  | logic  | logic  | logic  | –      | –      | –      | –     | –     | –     | –     | –     | –     | –     |
| $logic  | – | logic  | logic  | logic  | –      | –      | –      | logic  | –     | –     | –     | –     | –     | –     | –     |
| $logic  | – | logic  | logic  | –      | –      | –      | logic  | logic  | –     | –     | –     | –     | –     | –     | –     |

FIG. 14 A

```
_blck0presect:
        add      %g0, 0x10, %g5
_blck0sect0:
        subcc    %g5, 0x1, %g5
        beq      _blck1presect
        nop
        xor      %i6, %l7, %o6
        xnor     %i6, 0x000007f8, %o6
        or       %g3, %i2, %g3
        bleu     _blck0sect0
        nop
_blck0sect1:
        taddcc   %l7, %l7, %i2
        and      %i2, 0x00000e84, %o6
        xnor     %g3, 0x00000f2b, %g3
        mulscc   %o2, 0x00000e6e, %l2
        xnor     %l2, %i2, %o2
        add      %o2, %o7, %i3
        bvs      _blck0sect0
        nop
```

FIG. 14B

_blck0sect2:
    sub        %o0, %l1, %o0
    mulscc    %i0, 0x00000a93, %l4
    addx      %g3, %g3, %g1
    addx      %o0, 0x000006f0, %g1
    addx      %l6, %g2, %l6
    orn        %l6, 0x00000061, %i0
    taddcc    %l0, %o0, %o4
    bpos      _blck0sect5
    nop _blck0sect3:
    orn        %o4, %g2, %l0
    xnor      %l0, %g4, %o4
    sub        %l3, 0x000000a4, %g4
    andn      %g4, %l3, %o4
    subx      %i0, %g3, %l3
    orn        %g1, 0x00000bb8, %l3
    bn         _blck0sect0
    nop _blck0sect4:
    taddcc    %l3, %o1, %g1
    addx      %i0, %i0, %i0
    sub        %o3, %l5, %i0
    mulscc    %i7, 0x00000867, %o3
    tsubcc    %o3, 0x000006b4, %l7
    addx      %o3, %o3, %g1
    mulscc    %l7, 0x000009c2, %l2
    bg         _blck0sect0
    nop

METHOD FOR GENERATING TEST PROGRAMS

BACKGROUND OF THE INVENTION

The present invention relates to the development of test programs used to verify microprocessor functionality.

When designing microprocessors or similarly complicated VLSI devices a functional model representing the microprocessor's register-level functions is designed. To test the functional model one must confirm that it performs exactly as specified either by the designers or by the architecture model it represents. Programs executed using a simulation of the model are usually written by hand.

In the past ten years, with the rapid growth and complication of microprocessor technology, various new methods of testing microprocessors have been announced. Most of them relate to functional testing, which uses only the information that the user of the microprocessor can see (for example, the instruction set of the microprocessor).

Functional testing has proven to be extremely reliable, according to literatures such as Thatte, S. M. and J. A. Abraham, "Test Generation for Microprocessors", IEEE transactions on Computers, Vol.C-29, No. 6, June 1980, pp.429–441, and the like. And methods using random instruction generators are considered inexpensive and efficient for functional level microprocessor testing. The cost and speed at which errors are found merit the use of randomly generated test vectors or test programs. According to Klug, H., "Microprocessor Testing by Instruction Sequences Derived from Random Patterns", 1988 International Test Conference, Paper 4.2, pp.73–70, instruction sequences for test programs produced by generating a random binary pattern and then translating it into an instruction name (mnemonic) are equivalent to a functional test.

In the general functional level testing procedure, how quickly functional testing can be completed, and how well the functional model can be examined for errors both depend on the time spent in test generation.

However, the conventional methods for generating test programs have the following problems:

functional models that are tested using a limited number of handwritten programs may contain errors those programs cannot find.

automatic test generation at the functional level has previously not been able to create complicated relationships among instructions in the tests written.

the time that it takes to write functional level tests by hand, and the limited number of tests and limited variety of test sequences make functional testing a long process.

with every new change in a microprocessor's architecture, a new battery of functional tests must be written.

So far, the merits of testing using random methods on the microprocessor level have not reached the functional level of microprocessor design where all of the microprocessors functions must be verified against a simulation of the correct architecture design, which usually exists.

SUMMARY OF THE INVENTION

The present invention has the purpose of automatically generating high quality test programs which can be used in the functional testing stage of microprocessor design.

The means this invention uses to solve the problem in generating complicated instruction sequences is the multi-leveled hierarchical system of four abstraction levels, in which Levels 1, 2, 3 and 4 contain, as respective objects to be chosen, instructions, instruction types (instruction categories), sequences, and functions. In the present invention, test programs are generated through choosing instructions at random by using a hierarchical information comprising at least those four levels.

According to this invention, functional level test programs can be automatically generated by computer thus increasing the speed of test program generation compared to the conventional method generating all tests by hand. And because this hierarchical method can create complicated relationships through using instructions' sequence information, automatically generated test programs can test more complicated functions, thus speeding up the general functional testing process. By adapting the instruction and sequence tables, tests for a new computer architecture can be generated easily. The ability to refer to data containing both information regarding how often each level of the hierarchy is chosen, plus additional specific choices of objects, is the means to make specific instruction sequences that test the functions useful to the user. The invention also includes a random generator for the user to create instruction sequences not producible by hand.

Tests may also be generated with a specified order in which objects from the hierarchy are chosen. A specific series of objects determines what order they are chosen. This allows very specific tests to be written with variable preferences; combined with the merits of creating complicated relationships among instructions, many useful tests can be generated.

For complicated functional models, a hierarchy of more than four levels is effective, giving the user the ability to specify what he wants to test. The present invention includes the means to do so, where n levels are used, representing basic elements of test programs (which may include five levels: instructions, instruction types or categories, sequences, functions, and function types).

With the means of this invention, as described above, test programs of any length are generated in less time (compared to previous methods) and with complicated instruction relationships appearing in sequences of instructions.

BRIEF DESCRIPTION OF THE DRAWINGS

FIG. 2 is a flow diagram of a contemporary general functional testing method;

FIG. 3A is a diagram of the instruction table used in the actual implementation of the present invention;

FIG. 3B is a diagram of the sequence table used in the same;

FIG. 6 is a flow chart showing a detailed process of the operand processing in FIG. 5;

FIG. 7A is a diagram showing an initialized state of the table of register numbers used for choosing operands as instructions are chosen in the test program generator;

FIG. 7B is a diagram showing the table of register numbers during program execution;

FIGS. 11A and 11B are diagrams showing a section of the actual computer file which contains the instruction table as used in the implementation;

FIGS. 12A, 12B and 12C are diagrams showing a section of the actual computer file which contains the sequence table as used in the implementation;

FIGS. 14A and 14B are diagrams showing a sample output using the implementation.

DETAILED DESCRIPTION OF THE PREFERRED EMBODIMENTS

The basic principle of the test generation method will be described below.

This method is implemented by a computer program that reads in both a file of input and the hierarchical information based on the architecture of the microprocessor being tested.

The hierarchical information is stored in two tables (an instruction table and a sequence table) shown in FIGS. 3A and 3B, whose contents are as follows:

31. A list of Instructions which are the available instructions to be used in the test programs.

32. A list of Instruction Categories written so that the corresponding Instructions are easily found.

33. A list of Sequences which contains a specific combination of Instruction Categories. Each Instruction Category used must also appear in the Instruction Category list 32.

34. A list of Functions written so that the corresponding Sequences are easily found.

Figure 4:
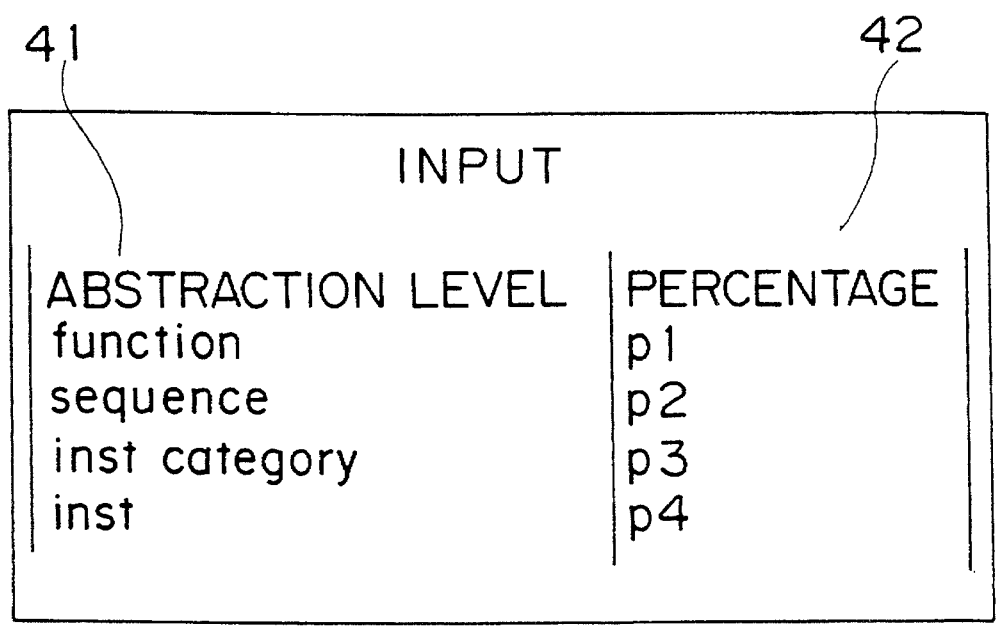
FIG. 4 is a diagram of the user input used by the implementation of the random instruction generation method of the present invention.
Figure 8:
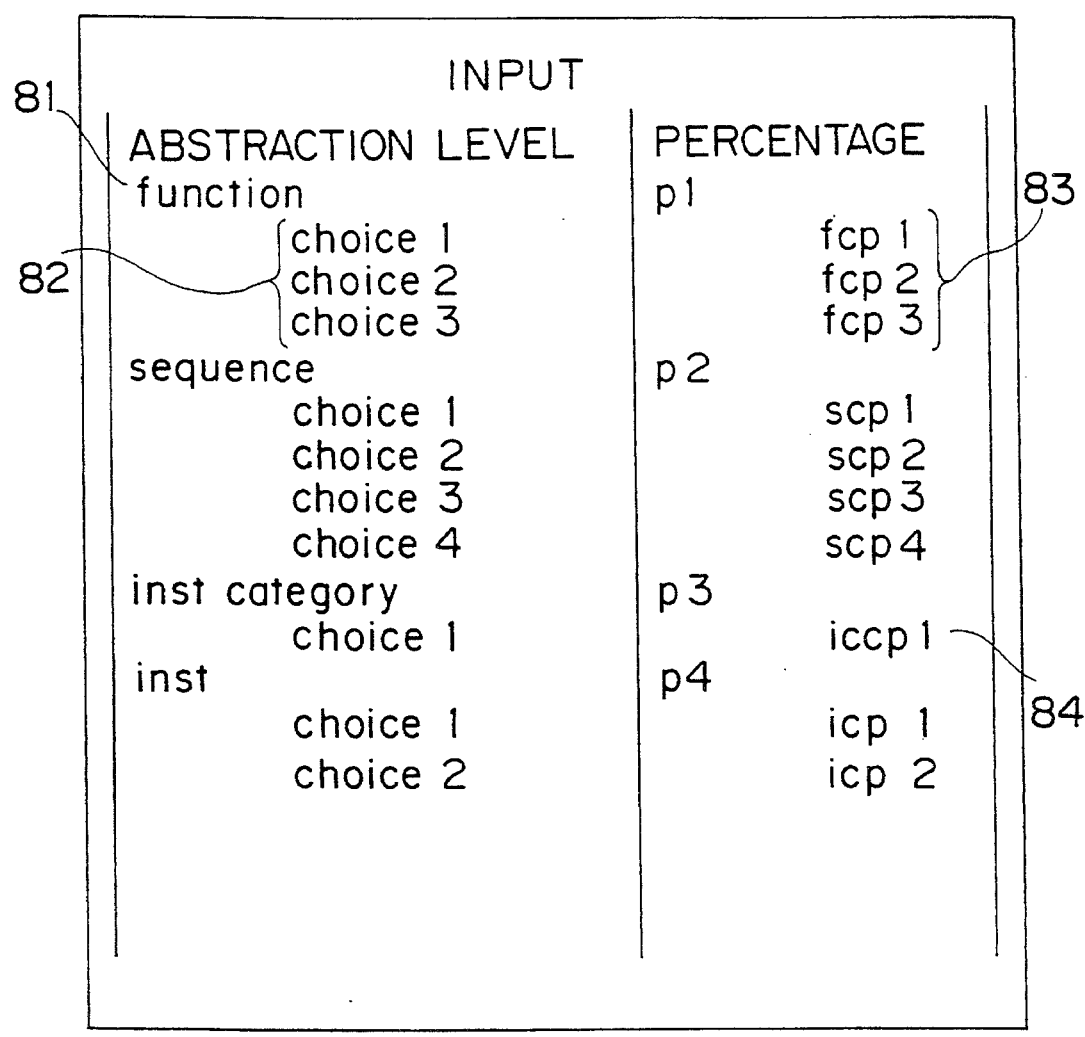
FIG. 8 is a table of input data with specific choices at each hierarchical level.

The basic format and the detailed format of the input file are shown in FIGS. 4 and 8 respectively, and its parts are listed as follows:

41. A list of hierarchical abstraction levels composed of four levels, i.e., Function, Sequence, Instruction Category and Instruction.

42. Choice percentages of respective hierarchical levels are listed.

81. As in the input table from FIG. 4, a list of the hierarchical levels.

82. Specific choices of Functions are listed under the Function level.

83. Specific Function Choices percentages (fcp) are listed to correspond with the ratio of the number of respective choice decisions to the total number of specific Function choices.

84. A percentage corresponding to one specific Instruction Category choice, which is 100 in this case.

The program generates an executable assembly language program used to verify the functionality of the microprocessor being developed.

The hierarchical information shown in FIGS. 3A and 3B is usually in the form of two files stored in memory. They usually do not change during the verification of the microprocessor in question. The input information, in a separate file (a user input file) in memory, does change. Therefore, with each new input file many test programs can be generated.

With the three files in place the user can execute the generator program and create test programs which are later used to verify the functionality of the microprocessor model in question.

Generating many test programs and executing them in the functional testing process shown in FIG. 2, the problem of depending on a limited number of hand-written programs is solved. The steps in this process, as shown in FIG. 2, are as follows.

At Step 21, test programs are generated by hand or automatically. They are written in a high-level assembly language.

At Step 22, tests are executed on a reference model that manifests the correct functional behavior, usually determined by the rules of a standard architecture.

At Step 23, tests are executed using a functional model of the microprocessor being developed. Functional errors in this functional model will appear when analyzing the results of test programs in next Step 24.

At Step 24, results are examined. The results (output) of the test programs executed at Steps 22 and 23 are compared, and any errors in the functional model from Step 23 will show up as differences in output. When no errors are found at Step 24, the functional testing ends. When errors are found at Step 24, the routine moves from Step 25 to Step 26 where the functional model from Step 23 is adjusted to account for errors found at Step 24.

Also, unlike previous verification schemes that have not been able to create complicated relationships among instructions in the tests written, this test generation method creates those relationships partly through pre-written instruction patterns. One pre-written pattern is shown in the first six lines of FIG. 14A, the resulting program produced from the test generating method. The pattern is "add, subcc, beq, nop", which in the architecture's assembly language means, "add, subtract, branch if equal to zero, no operation". This sequence prevents an infinite loop from taking place in the event that a randomly generated branch instruction creates a loop. With this and other predetermined patterns, special instruction relationships can be created that are dependent on characteristics of the microprocessor architecture.

Also, the fact that tests are generated in little time shortens the functional testing stage of microprocessor development.

Figure 1:
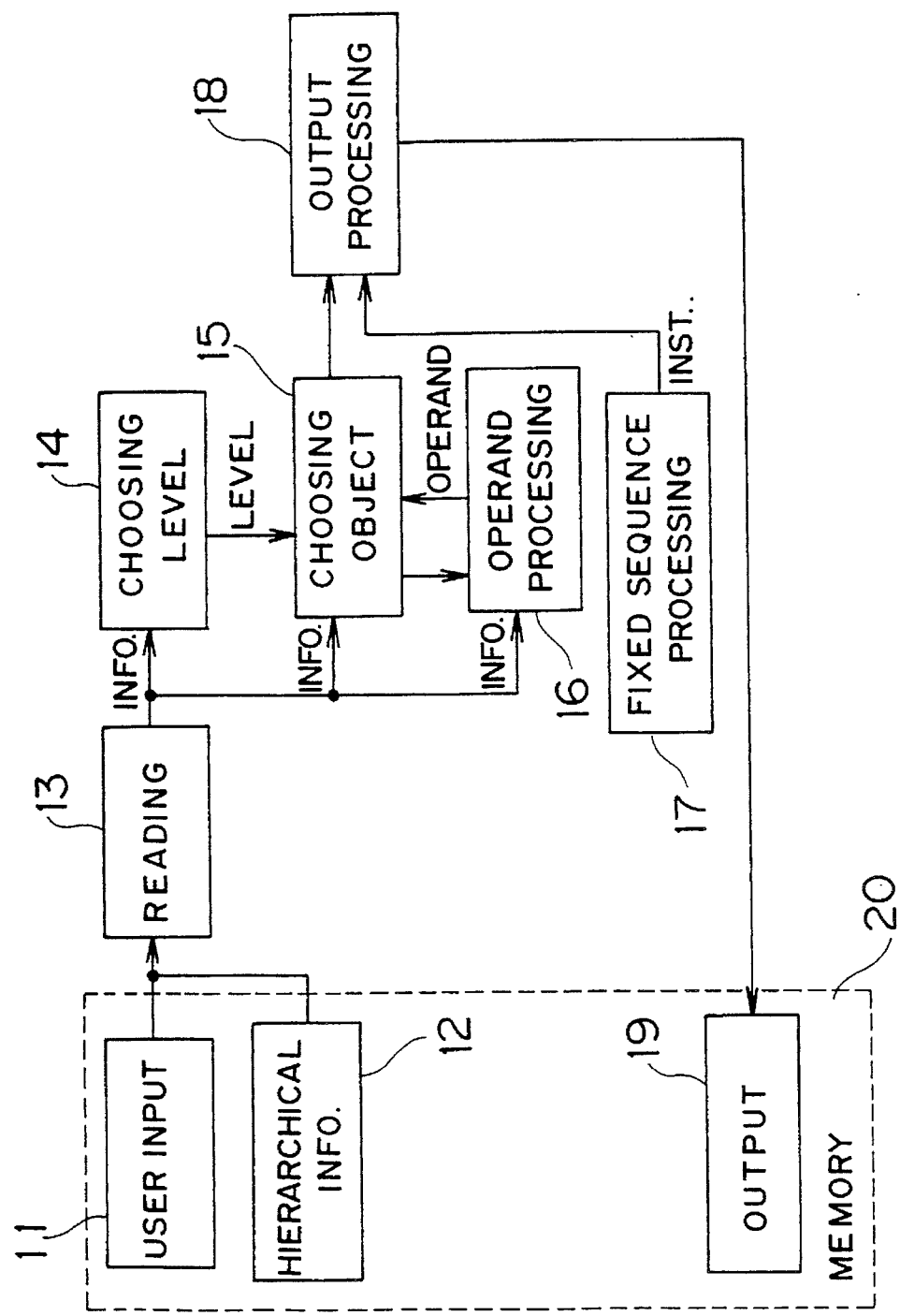
FIG. 1 is a diagram of the system organization of the implementation of the test generation method of the present invention.

FIG. 1 shows the main system organization of the test program generator. The information in the user input 11 and the hierarchical information 12 are stored in the memory 20 and read by the reading unit 13.

Level choosing unit 14 chooses the hierarchical level from which objects will be retrieved, according to the user input 11. Object choosing unit 15 chooses a lower object from the level chosen by the level choosing unit 14. The object is chosen either at random by using the hierarchical information 12 or by using specific information given in the user input 11 regarding which objects should be chosen. The lowest object, which is an instruction, is given to output processing unit 18. Operand processing unit 16 chooses operands of the instruction chosen by the object choosing unit 14 according to the hierarchical information 12. Fixed sequence processing unit 17 outputs special sequences already fixed within the test program. For example, a sequence of several instructions is used to prevent infinite loops from occurring in the test program. Output processing unit 18 synthesizes a test program from instructions chosen by the object choosing unit 15 and instructions output by the fixed sequence processing unit 17 and stores the synthesized test program as an output file 19 into the memory 20.

Figure 5:
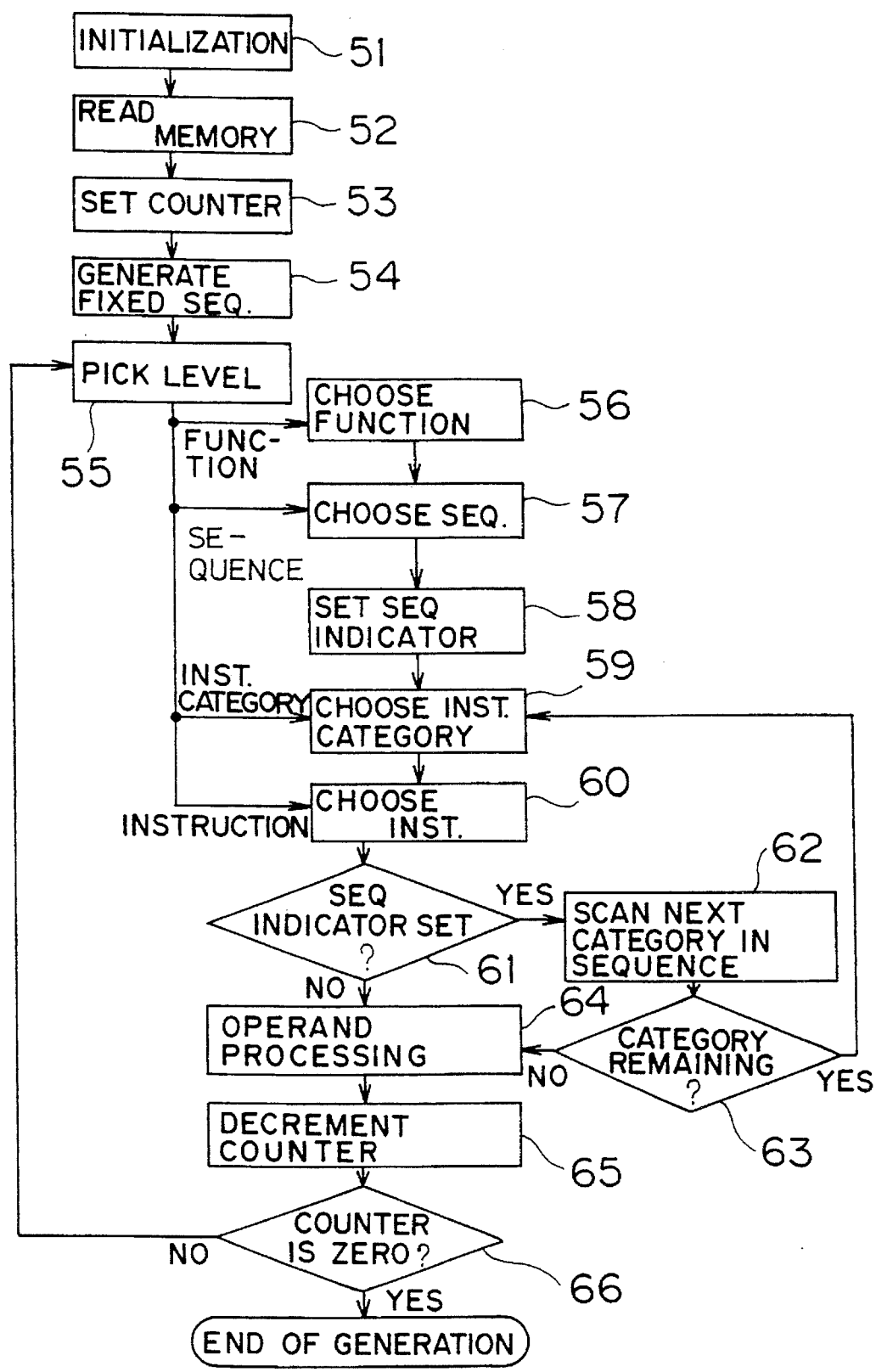
FIG. 5 is a block diagram of the random instruction generation method of the present invention.

An instruction generation method of the present invention is shown in FIG. 5 with the following steps:

At Step 51, an initialization routine for setting register contents or the like is executed.

At Step 52, the data of the user input 11 and the hierarchical information 12 in the memory 20 (FIG. 1) are read. The read data are used at each step of the following processes.

At Step 53, a counter, that determines the length of the test program to be written, is set.

At Step 54, a predetermined fixed sequence in order to, for example, prevent infinite loops from occurring in the test program is generated.

At Step 55, using the user input, a level of the hierarchy is chosen, and the appropriate action is taken at Steps 56, 57, 59, 60.

At Step 56, a Function is chosen at random from the sequence table in FIG. 3B.

At Step 57, a Sequence is chosen at random from the sequence table.

At Step 58, a Sequence Indicator is set, to indicate that a Sequence is being used.

At Step 59, an Instruction Category is chosen at random from the instruction table in FIG. 3A.

At Step 60, an Instruction is chosen at random from the instruction table.

When the Sequence Indicator is set, the routine moves from Step 61 to Step 62 and therein another Instruction Category is scanned from the sequence chosen at Step 57. When an Instruction Category to be processed remains, the routine returns to Step 59 from Step 63.

When a Function level or a Sequence level is chosen at Step 55, the loop from Step 59 to Step 63 is repeatedly executed. At the time when the processing of all Instruction Categories in the Sequence chosen at Step 57 is completed, the routine moves from Step 63 to Step 64.

When an Instruction Category level or an Instruction level is chosen at Step 55, setting the Sequence Indicator at Step 58 is not executed so that the routine immediately proceeds from Step 61 to Step 64.

At Step 64, the operand processing as described in detail below is executed.

At Step 65, the counter set at Step 53 is decremented. When the counter indicates 0 by the decrementation, the instruction generation ends. Meanwhile, when the counter does not indicate 0, the routine returns from Step 66 to Step 55.

The fixed sequence generation shown at Step 54 can also be executed in the loop from Step 55 to Step 66.

As mentioned above, the counter at Step 53 is set to determine the length of the program. Looking at FIG. 13, which is an actual example of the input used, the four values corresponding to 'Blocks$_{13}$low', 'Blocks$_{13}$high', 'Sects$_{13}$low' and 'Sects$_{13}$high' are used. The value 'Blocks low' and the value 'Blocks$_{13}$high' are used as lower and upper limits to determine at random how many blocks of instructions should be used in the test program. Each block contains a given number of sections determined at random by the lower limit value 'Sects$_{13}$low' and the higher limit value 'Sects$_{13}$high' of the sections.

Figure 13:
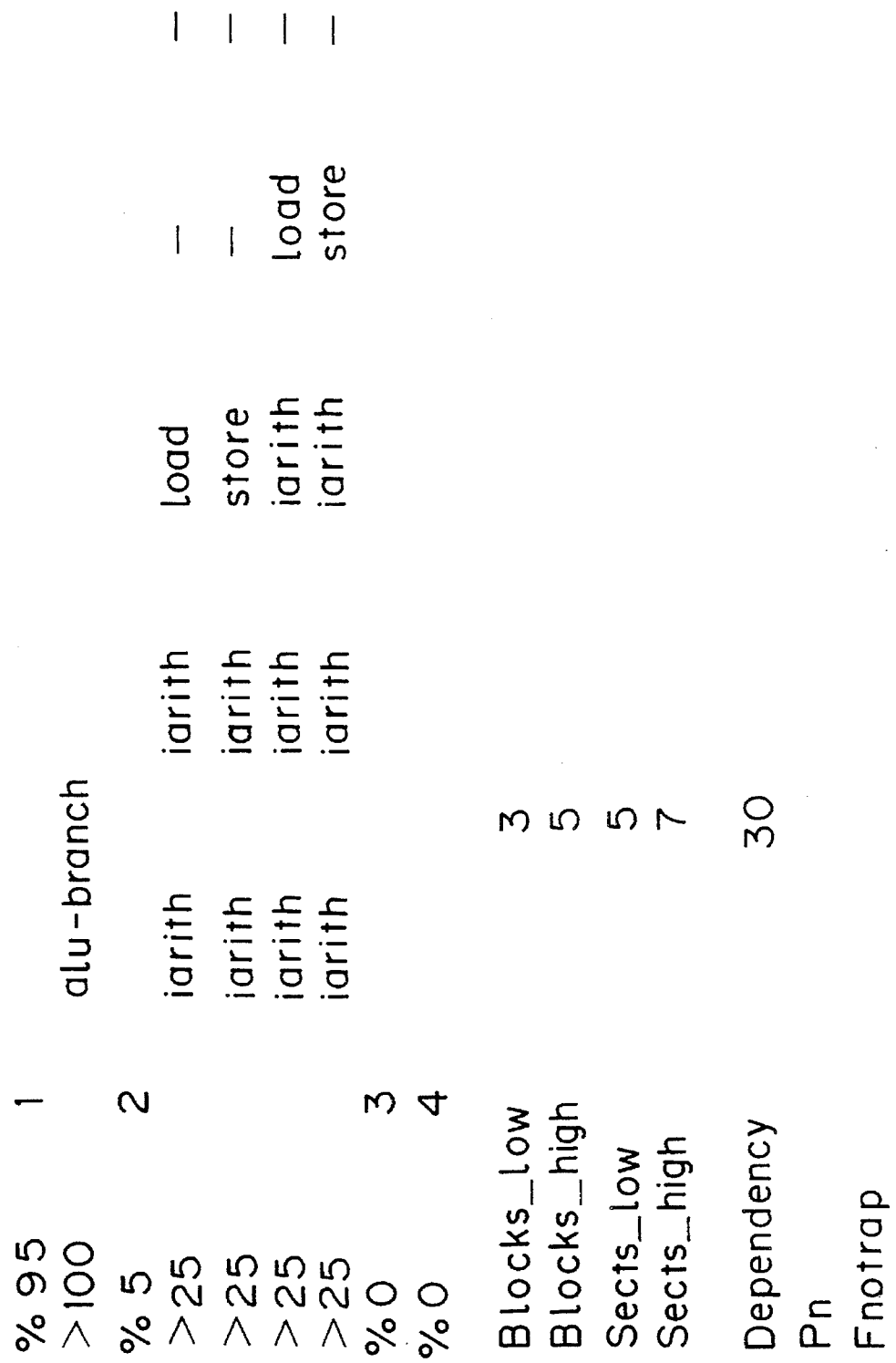
FIG. 13 is a diagram showing a section of the actual computer file containing sample user input as used in the implementation.

The "Dependency" indicator in FIG. 13, set to 30 in this case, is used to determine the operands for the instructions generated. As explained in detail below, the indicator relates to the probability that new registers are chosen when each decision is made. The "Pn" designates no privileged instructions to be used. Whether or not an instruction is privileged is included in the instruction information. Also the "Fnotrap" symbol indicates whether or not a specific sequence of instructions that prevents traps from occurring after each floating point instruction should be generated or not.

Also, the user input may comprise information that regards exactly what objects are chosen and in what order. For example, the information might be a long sequence of instructions and sequences. Using the present method, a test program can be created that contains instructions generated in the same sequence as that given in the user input.

In FIG. 5 we see the random choosing method. In the 'pick level' stage (Step 55) of the method a random number is chosen, and in this implementation FIG. 13 indicates that a Function level (Level 4), a Sequence level (Level 3), an Instruction Category level (Level 2) and an Instruction level (Level 4) should be picked at respective probabilities of 95%, 5%, 0% and 0%. Specifically, every time a random number between 1 and 100 is generated. Wherein, the Sequence level is picked when the generated random number is between 1 and 5, and the Function level is picked when the number is between 5 and 100.

In this example, when the Function level is picked, the specific choice "alu-branch" is picked. The percentage, 100, is the value of the choice percentage of "alu-branch" (refer to the general format of input in FIG. 8).

FIGS. 12A, 12B and 12C, showing a portion of the sequence table used in the program, illustrate a list of Functions such as "load-store", "alu-branch" and "alu", and lists of Sequences included in respective Functions. When the specific Function "alu-branch" is picked as described above, a Sequence is picked at random from the corresponding Sequence list including twelve Sequences. The hyphens represent blank spaces because the Sequences are not always eight categories long. Supposing the first Sequence "iarith bicc - - - " of "alu-branch" is picked; then the Sequence Indicator is set, and the first Instruction Category, "iarith" is chosen.

FIGS. 11A and 11B, showing a portion of the Instruction Table, illustrate a list of Instruction Categories such as "load", "store", "logic", "shift" and "iarith", and lists of Instructions included in respective Instruction Categories. When the specific Instruction Category "iarith" is chosen as described above, an Instruction is then chosen at random from the corresponding Instruction list that includes seven Instructions. When an Instruction included in the Instruction Category "iarith" is chosen (created) in the above fashion, the Instruction generation moves to the next Instruction Category in the test program.

The next Instruction Category in the chosen Sequence "iarith bicc-" is "bicc". Similarly, an Instruction (not shown) listed under "bicc" is chosen. In this fashion, a program is generated, and the result is shown in FIGS. 14A and 14B.

FIG. 6 shows a detailed process of the Operand Processing step 64 executed after an Instruction or Sequence of Instructions has been chosen in FIG. 5. For each chosen Instruction, there is a corresponding set of operand information. This operand information is first used to determine what operands are needed for each Instruction (Step 71). Depending on the information, an address operand is chosen (Step 72) or a register operand is chosen (Steps 73, 74). In FIGS. 11A and 11B, "[Add]" is shown as an address operand, and "Rrd" and "Rsl" are shown as register operands. In the case of a register operand, the operand information first determines which kind of register is selected (Step 73). Then, a register number can be chosen according to the algorithm explained using FIGS. 7A and 7B (Step 74).

Picking register operands for the chosen instructions happens according to the method described as follows. In this implementation there are five kinds of registers used: input (i), output (o), local (l), global (g), and floating-point (fp). Looking at FIG. 7A, we see an initialized table of registers. Respective columns in the table correspond to the five kinds of registers used: i, o, l, g, and fp. When initialized, the register numbers are listed in numerical order from 0 to the maximum number for each kind of register. For example, register numbers in the column showing the register are initialized in the order 0, 1, 2, . . . ,7 while register numbers in the column showing the register fp are initialized in the order 0, 1, 2, . . . ,31.

At the beginning of each instruction block, the register numbers in all five columns are mixed at random. The "choice of registers" data, that indicate which register is currently being used, are all set to zero. A zero in the "choice of registers" area indicates the top-most element, or register number, of each column.

FIG. 7B shows the table as it may look further along in the program execution. A table of five numbers labeled "choice of registers" designates which register of each kind is currently being used. The choice for the i (input) register is 3, which is the fourth element of the column, or register i1. Registers o7, 12, g0, and fp15 are also designated in the figure. In the algorithm, an instruction may be chosen which requires an operand of type i (input) to be chosen. Looking at the "choice of registers" area, element 3, or register i1, is chosen.

Finally, the choice of registers is either incremented or not. This depends on both the value of the "Dependency" indicator in the user input and a random decision. A high dependency value indicates that the probability is high that the value in the "choice of registers" area will stay the same, and thus create a data dependency as the same register is used again. To explain, suppose the Dependency value is 30. Then the "choice" value will not change about 30% of the time on the average. If the value that currently points to register i1 is incremented, it will point to i4 until the next time the table of registers is mixed at random at the beginning of the next block. In this fashion, operands are chosen so that recently used registers can appear with a frequency determined by the "Dependency" parameter.

Figure 9:
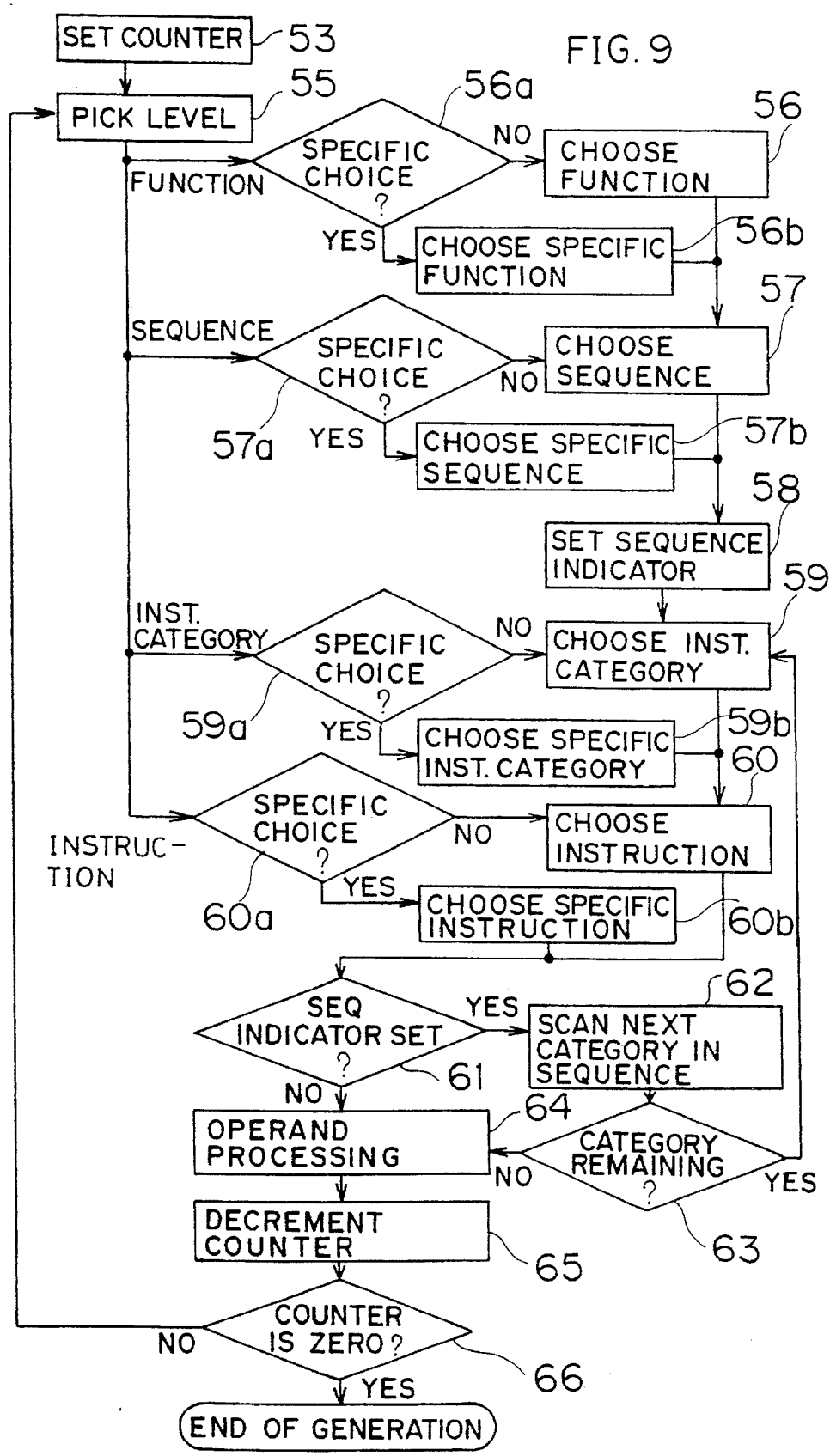
FIG. 9 is a flow chart of the random choosing method that implements specific choices.

FIG. 9 shows a test generation method using a user input in which each hierarchical level has specific choices as shown in FIG. 8. Compared to the method shown in FIG. 5, FIG. 9 includes several new steps for processing specific choices: 56a, 56b, 57a, 57b, 59a, 59b, 60a and 60b. In FIG. 9, Steps 51, 52, 54 in FIG. 5 are omitted to simplify the figure. Choices of objects according to choice percentages of respective specific choices are executed in Steps 56b, 57b, 59b, 60b, together with the level picking according to the choice percentage at Step 55.

The test generation method using six levels in the hierarchy of instructions will be described, as a specific case of the generalized n-level hierarchy. When a microprocessor's functionality is particularly complicated, the instructions and sequences might need a hierarchy with more complicated relationships, i.e., one with more than four levels.

In this case, the six levels may be named as follows:

| | |
|---|---|
| Level 1. | Instructions |
| | For example: load byte, load halfword, add, sub, mul, div, add double |
| Level 2. | Instruction Categories |
| | For example: load, store, logic, arithmetic |
| Level 3. | Sequences |
| | For example: load-load-load-store |
| Level 4. | Functions |
| | For example: load/store, alu, fpu, exception |
| Level 5. | Function Categories |
| | For example: memory, bus, calculate, branch |
| Level 6. | Function Category Groups |
| | For example: external, cpu_core |

In this case, the Function Categories level and the Function Category Groups level are added at higher positions than the Instruction level, Instruction Category level, Sequence level and Function level. The names of each level are really not as important as the relationships between each level which make up the hierarchical information used by the test generation method.

If after all of the load and store Instructions are categorized in a "load/store" Function, this function may be generalized further into a memory-related or bus-related Category. Then this can be separated from the $cpu_{13}core$ by naming a group of Function Categories "external".

Figure 10:
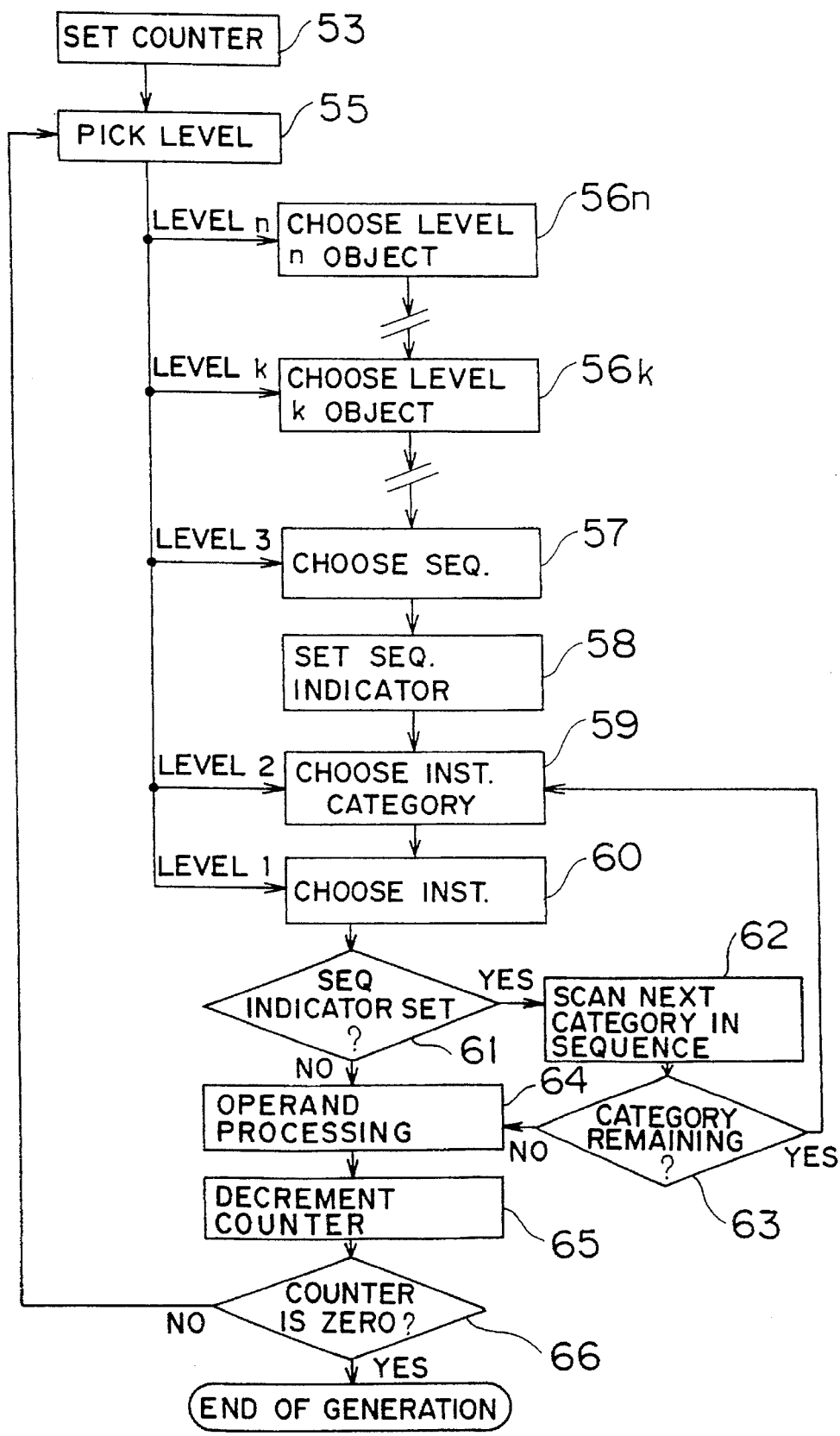
FIG. 10 is a flow chart of the random choosing method with n levels in the hierarchy.

FIG. 10 shows the generalized n-level method. Steps 51, 52, 54 in FIG. 5 are omitted to simplify the figure. In this figure showing the case of n levels, Step 56 for choosing a Function in FIG. 5 is divided into n-3 Steps (56n, . . . , 56k, . . . ). In the n-3 Steps, for example, a Step for choosing a Function Category and a Step for choosing a Function Category Group are included in addition to a Step for choosing a Function.

According to the method in FIG. 10, a level is picked at Step 55 and then objects are chosen in consecutive levels until a single Instruction is picked, as in the method with four levels. If level 6 is chosen at Step 55, then the "external" group of Function Categories might be picked. Then, a choice is made from the Function Categories associated with that group. For example, "memory" might be chosen. Next, a Function is chosen. This may be "load/store". A load/store Sequence is then chosen, and finally, Instructions are chosen one by one from the Instruction Categories (for example, "load") in that Sequence.

What is claimed is:

1. A method for a data processor to generate a test program for verifying processors, said method comprising:

a first step of referencing input information and hierarchical information, wherein:

said hierarchical information comprises objects categorized in at least four levels: an instruction level as a level 1, an instruction type level as a level 2, a sequence level as a level 3, and a function level as a level 4, where:

an object in said instruction level comprises an instruction name, instruction information and operand information, an object in said instruction type level is a name of categories of objects in said instruction level, an object in said sequence level is a combination of objects in said instruction type level, and an object in said function level is a name of categories of objects in said sequence level; and said input information regards how often each level of said hierarchical information is chosen; a second step of choosing a level from among said at least four levels of said hierarchical information according to said input information referenced at said first step, and selecting an object from said chosen level;

a third step of decrementing said chosen level where said chosen level is higher than said level 1, and selecting an object from said decremented level of said hierarchical information, using both a random number and said object selected from said chosen level, and repeating this selection step until an object is selected from the instruction level of said hierarchical information; and a fourth step of generating a test program formed from at least one object of said instruction level of said hierarchical information selected in said second and said third steps.

2. The method according to claim 1, wherein said first step includes a step of referencing the input information, which further comprises information regarding a frequency at which each object is chosen from its associated level of said hierarchical information.

3. The method according to claim 2, further comprising a step of, when an error regarding the specific object is found, setting the frequency at which the specific object is chosen higher so that a detailed test regarding the specific object is executed.

4. The method according to claim 1, wherein said fourth step of generating a test program further comprises generating predetermined instructions as a part of the test program.

5. The method according to claim 4, wherein said step of generating predetermined instructions includes a step of using a predetermined sequence of instructions so as to prevent an infinite loop from appearing in the test program.

6. The method according to claim 1, wherein an instruction level object further comprises:

information describing the kinds of operands needed in the instruction level object;

whether or not the instruction level object is privileged; and whether or not the instruction level object can change the condition codes of a Processor-State Register.

7. The method according to claim 1, further comprising:

a step of selecting specific kinds of operands for each instruction, based on information about the operands given in said hierarchical information with the instructions; and a step of choosing most recently-used operands at a frequency defined by an input parameter.

8. The method according to claim 7, wherein said step of choosing most recently-used operands includes a step of choosing operands according to a register table which has a list of each type of register, a list of the selectable register numbers regarding each type of register, and for each type of register, a record of which register number regarding each type of register was chosen most recently; and information regarding a frequency at which the register having the same register number as the most recently chosen register number is chosen.

9. A memory storing hierarchical information for enabling a data processor to generate a test program, said hierarchical information comprising at least four levels: an instruction level, an instruction type level, a sequence level, and a function level, where an object in said instruction level comprises an instruction name, instruction information and operand information;

an object in said instruction type level is a name of categories comprising objects in said instruction level, an object in said sequence level is a combination of objects in said instruction type level, and an object in said function level is a name of categories comprising objects in said sequence level.

10. The memory according to claim 9, further comprising information regarding a frequency at which each specific object is chosen from associated levels in the hierarchy.

11. A method for a data processor to generate a test program for verifying processors, said method comprising:

a first step of referencing input information and hierarchical information, wherein:

said hierarchical information comprises objects categorized in at least four levels: an instruction level as level 1, an instruction type level as level 2, a sequence level as level 3, and a function level as level 4, where:

an object in said instruction level comprises an instruction name, instruction information and operand information, an object in said instruction type level is a name of categories of objects in said instruction level, an object in said sequence level is a combination of objects in said instruction type level, and an object in said function level is a name of categories of objects in said sequence level; and said input information regards what order said objects are chosen;

a second step of choosing a level from among said at least four levels of said hierarchical information according to said input information referenced at said first step, and selecting an object from said chosen level;

a third step of decrementing said chosen level where said chosen level is higher than said level 1, and selecting an object from said decremented level of said hierarchical information, using both a random number and said object selected from said chosen level, and repeating this selection step until an object is selected from the instruction level of said hierarchical information; and a fourth step of generating a test program formed from at least one object of said instruction level of said hierarchical information selected in said second and said third steps.

12. A method for a data processor to generate a test program for verifying processors, said method comprising:

a first step of referencing input information and hierarchical information, wherein:

said hierarchical information comprises n levels where n is a chosen number, each level containing a kind of object, where:

objects of level 1 each comprise an instruction name, instruction information, and operand information, objects of level 2 are types of objects in said level 1, objects of level 3 are sequences of objects in said level 2, objects of level 4 are types of objects in said level 3,

. . .

objects of level k are types of objects in level k−1, . . .

objects of level n are types of objects in level n−1;

said input information regards how often each level of said hierarchical information is chosen;

a second step of choosing a level from among said n levels of said hierarchical information according to said input information referenced at said first step, and selecting an object from said chosen level;

a third step of decrementing said chosen level where said chosen level is higher than said level 1, and selecting an object from said decremented level of said hierarchical information, using both a random number and said object selected from said chosen level, and repeating this selection step until an object is selected from said level 1 of said hierarchical information; and a fourth step of generating a test program formed from at least one object of said level 1 of said hierarchical information selected in said second and said third steps.

* * * * *